United States Patent
Takano et al.

(10) Patent No.: US 8,451,805 B2
(45) Date of Patent: May 28, 2013

(54) SPREAD SPECTRUM TRANSMITTING AND RECEIVING APPARATUS USING A BEACON SIGNAL FOR CARRIER SENSING

(75) Inventors: Hiroaki Takano, Saitama (JP); Kazuhisa Takamura, Tokyo (JP); Jun Iwasaki, Tokyo (JP)

(73) Assignee: Sony Corporation (JP)

( * ) Notice: Subject to any disclaimer, the term of this patent is extended or adjusted under 35 U.S.C. 154(b) by 1941 days.

(21) Appl. No.: 10/450,806

(22) PCT Filed: Nov. 1, 2002

(86) PCT No.: PCT/JP02/11422
§ 371 (c)(1),
(2), (4) Date: Jun. 16, 2003

(87) PCT Pub. No.: WO03/039050
PCT Pub. Date: May 8, 2003

(65) Prior Publication Data
US 2004/0030713 A1 Feb. 12, 2004

(30) Foreign Application Priority Data

Nov. 1, 2001 (JP) ................................ 2001-336997
Mar. 5, 2002 (JP) ................................ 2002-059140

(51) Int. Cl.
*H04W 4/00* (2009.01)
(52) U.S. Cl.
USPC ....................................................... 370/338
(58) Field of Classification Search
USPC ................ 370/441, 328–330, 332–342, 350, 370/445, 447, 448, 503, 479, 509–515, 490, 370/500, 136, 219, 220, 295, 316; 455/502, 455/11.1, 41.2, 522, 69; 375/146, 147, 130, 375/135, 17
See application file for complete search history.

(56) References Cited

U.S. PATENT DOCUMENTS

| | | | |
|---|---|---|---|
| 6,175,744 B1 * | 1/2001 | Esmailzadeh et al. | 455/522 |
| 6,301,308 B1 * | 10/2001 | Rector | 375/270 |
| 6,603,818 B1 * | 8/2003 | Dress et al. | 375/295 |
| 6,700,939 B1 * | 3/2004 | McCorkle et al. | 375/295 |
| 6,760,590 B2 * | 7/2004 | Miyoshi et al. | 455/452.1 |
| 6,795,509 B1 * | 9/2004 | Yamamoto et al. | 375/267 |
| 2003/0186713 A1 * | 10/2003 | Sugaya et al. | 455/501 |
| 2004/0101033 A1 * | 5/2004 | Suzuki | 375/146 |

FOREIGN PATENT DOCUMENTS

EP 1087540 A1 * 3/2001
JP 9-64884 A 3/1997

(Continued)

OTHER PUBLICATIONS

Ryuji Kawano, "Impulse Radio niyoru Ultra Wideband (UWB) Musen Tsushin no Kiso to Hatten", The Institute of Electronics, Information and Communication Engineers, Jul. 31, 2001, SST2001-40, pp. 77 to 84.

Dong In Kim et al, "Random Assignment/Transmitter-Oriented Code Scheme for Centralized DS/SSMA Packet Radio Networks," IEEE Journal on Selected Areas in Communications, IEEE Service Center, Piscataway, US, vol. 14, No. 8, Oct. 1996, XP011054551 ISSN: 0733-8716, pp. 1560-1568.

European Search Report issued on Aug. 2, 2010 in connection with corresponding European Appln. No. 10 00 4834.

*Primary Examiner* — Mark Rinehart
*Assistant Examiner* — Mohammad Anwar
(74) *Attorney, Agent, or Firm* — Lerner, David, Littenberg, Krumholz & Mentlik, LLP

(57) ABSTRACT

A radio wave detecting apparatus that can perform carrier sense of radio waves subjected to spread spectrum with a simple configuration, in which a spread code is multiplied by an information signal, the band is spread, and a spread information signal is generated. A beacon signal in a predetermined band is synthesized with the spread information signal, and a synthesized signal is transmitted as a radio wave. Furthermore, only a signal component in a predetermined band is extracted from a received radio wave, so that a beacon signal is separated. The presence of a radio wave is detected based on the receiving power of the separated beacon signal. If the presence of the radio wave is detected, the transmission of the radio wave is stopped.

18 Claims, 7 Drawing Sheets

FOREIGN PATENT DOCUMENTS

| | | | |
|---|---|---|---|
| JP | 9-064884 A | | 3/1997 |
| JP | 09064884 | * | 3/1997 |
| JP | 10-107683 A | | 4/1998 |
| JP | 10107683 A | * | 4/1998 |
| JP | 11112469 A | | 4/1999 |
| WO | 0126241 A1 | | 4/2001 |

* cited by examiner

SPREAD SPECTRUM TRANSMITTING AND RECEIVING APPARATUS USING A BEACON SIGNAL FOR CARRIER SENSING

CROSS-REFERENCE TO RELATED APPLICATIONS

The present application is a national stage application under 35 U.S.C. §371 of International Application No. PCT/JP02/11422, filed Nov. 1, 2002, which claims priority from Japanese Application Nos. P2001-336997, filed Nov. 1, 2001, and P2002-059140, filed Mar. 5, 2002, the disclosures of which are incorporated herein by reference.

BACKGROUND OF THE INVENTION

1. Technical Field

The present invention relates to a transmitting apparatus, a transmitting method, a transmission control program and a transmission control program storage medium, a receiving apparatus, a receiving method, a receiving control program and a receiving control program storage medium, and is suitably applied, for example, to a radio communication system using a spread spectrum system.

2. Background Art

In recent years, as an access control method in packet transmission or the like, a carrier sense multiple access (CSMA) system has been used. In such the CSMA system, when a certain terminal tries to perform transmission, power measurement is performed previously to detect whether another terminal is on transmitting or not (this is referred to as carrier sense), and when the receiving voltage is a predetermined value or less, it is judged that any other terminal is not on transmitting, and the transmission is performed so as to avoid simultaneous transmission.

By the way, in recent years, a wireless local area network (LAN) system applying a spread spectrum (SS) system has been becoming practically used. Furthermore, an ultra wide band (UWB) transmission system sending and receiving data by using an extremely-wide band of some GHz with pulse has been proposed for an application such as a personal area network (PAN).

In a direct spread (DS) system which being a kind of the SS system, at the sending side, the transmission is being made after the spread of the occupying band by multiplying an information signal with a random code series called a pseudo noise (PN) code, and at the receiving side, the information signal is being reproduced after the reverse spread by multiplying the received spread information with the PN code. The UWB transmission system is a system that the spread ratio of this information signal is enlarged to the utmost limit. The signal of the UWB transmission system has only an electric power of an equal level or less than a noise level in each frequency area, therefore, any communication system using the UWB transmission system has an advantage that it is comparatively easily compatible with a communication system using another system.

FIG. 9 shows an example of sending/receiving signals in transmission using the UWB system. An input information signal D100 is being multiplied with the spread code D101, and thus the spread spectrum is performed. Sometimes this multiplication by the spread code is omitted depending on the communication system.

The spread information signal D102 being subjected to the spread spectrum is modulated by an impulse signal (wavelet pulse) on the UWB system, and the signal is transmitted as a spread modulation signal D103. As the modulation technique used at this time, any of pulse position modulation (PPM), phase modulation, amplitude modulation, etc can be used. Since the impulse signal used in the UWB system, because of its an extremely-narrow pulse nature of less than 1 nsec, will use an extremely-wide band of some GHz as a frequency spectrum. Therefore, the spread modulation signal D103 only has such electric power at a noise level or less in each frequency area.

On the receiving side, a receiving signal D104 is mixed in noise, but it can be detected by calculating the correlation value of the receiving signal D104 with the impulse signal. Moreover, in many systems, by such signal spreading, many impulse signals are transmitted for each one bit of transmission information. Thereby, the receiving correlation value D106 of the impulse signal can be further integrated by the length of spread sequence (a correlation integrated value D107), thus, the signal detection can be further more easily attributed.

In FIG. 10, a structural embodiment of a radio communication terminal using the UWB system is shown. The radio communication terminal 100 is constructed by elements for sending 101 to 104 and elements for receiving 105 to 110; a sending/receiving timing control part 111; an RF part 112; and a central control part 113 for totally controlling the said radio communication terminal.

At the time of transmitting, the information source coding part 101 of the radio communication terminal 100 performs predetermined source coding processing on an information signal entered from the outside, and supplies this to a communication channel coding part 102. The communication channel coding part 102 performs predetermined channel coding processing on the information signal, and supplies this to a pulse generating part 104 via a sending buffer 103.

The pulse generating part 104 modulates the information signal by the impulse signal based on the control by the timing control part 111, and generates a modulation signal spread by the UWB system, and it is amplified by the RF part 112, and then is transmitted via an antenna 114.

On the other hand, at the time of receiving, the RF part 112 of the radio communication terminal 100 amplifies a receiving signal received via the antenna 114, and supplies this to a pulse correlation unit 105. The pulse correlation unit 105 calculates the correlation of the receiving signal with the impulse signal, and further integrates this correlation value by the number of pulses for one bit of transmission signal by an integrator 106, and outputs this.

An analog-to-digital conversion part 107 digitally converts the correlation value integrated value being outputted from the integrator 1-6, and supplies this to a channel decoding part 109 as a demodulation signal via a receiving buffer 108. The channel decoding part 109 performs channel decoding processing on the demodulation signal, and supplies this to an information source decoding part 110. The information source decoding part 110 performs source decoding processing on the demodulation signal, restores the information signal, and outputs this to the outside.

In the UWB transmission system as described above, since a signal is spread in a wide band and it is transmitted, the power density of the signal in each frequency area becomes the power density of noise or less. Therefore, in the case where carrier sense is performed on the UWB transmission system, the presence of a spread information signal can be determined only after the spread information signal is synchronized and back-spread. However, it takes a time to perform the above synchronization and back-spreading processing on the spread information signal. Therefore, in a system for performing intermittent communication as packet transmission, there has been a problem that it is hard to perform carrier sense. There has been another problem that the preamble for synchronization added to each packet for obtaining the synchronization becomes long.

SUMMARY OF THE INVENTION

In view of the foregoing, an object of this invention is to provide a transmitting apparatus, a transmitting method, a transmission control program and a transmission control program storage medium, a receiving apparatus, a receiving method, a receiving control program and a receiving control program storage medium that can perform the carrier sense of a radio wave subjected to spread spectrum with a simple configuration.

Furthermore, the present invention is proposing a receiving apparatus, a receiving method, a receiving control program and a receiving control program storage medium that can easily obtain the synchronization with a radio wave subjected to spread spectrum.

To obviate such problem according to the present invention, by multiplying an information signal by a spread code for spreading the band, a spread information signal is generated, and then the said spread information signal is synthesized with a beacon signal in a predetermined band for the transmission as a radio wave. As a kind of the spread code, an impulse signal on the UWB system is specially used.

Furthermore, in the present invention, it is arranged that only a signal component in a predetermined band is extracted from a received radio wave, so that a beacon signal is separated; the presence of a radio wave is detected based on the receiving power of the above separated beacon signal; and the transmission of a radio wave is stopped when the presence of the above radio wave is detected.

By transmitting a spread information signal being synthesized with a beacon signal in a predetermined band as a radio wave, by extracting only a signal component in a predetermined band from a received radio wave for the separation of the beacon signal, and by detecting the presence of the radio wave based on the receiving power of the above separated beacon signal, such carrier sense of a radio wave subjected to spread spectrum can be performed with a simple configuration. Moreover, the start timing of a spread modulation signal can be decided according to the detection of the beacon signal.

Furthermore, in the case where data is transmitted with the spread modulation signal via the beacon signal, synchronization with the spread modulation signal is obtained by means of the obtained synchronous timing of the beacon signal, so that the time necessary to obtain synchronization with the spread modulation signal can be shortened and the data length of a preamble for synchronization in the spread modulation signal can be shortened, and thus, data transmission efficiency can be generally improved.

DETAILED DESCRIPTION

Best Mode for Carrying Out the Invention

The present invention will be described in detail with reference to the accompanying drawings.

(1) Basic Configuration of Radio Communication System

Figure 1:
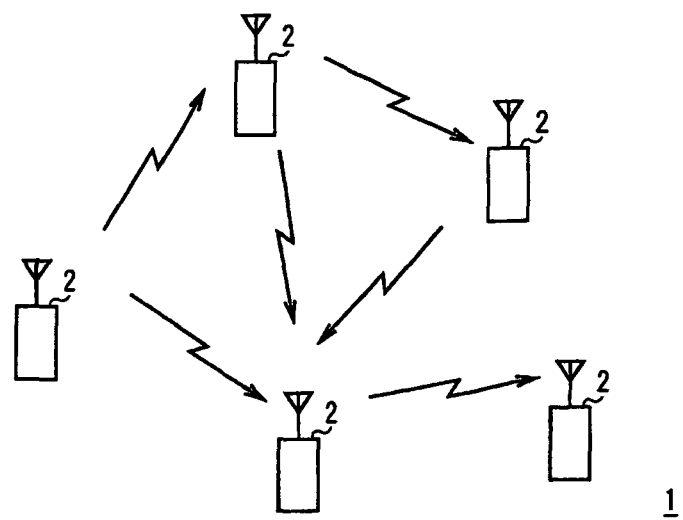
FIG. 1 is a schematic diagram showing the general configuration of a radio communication system according to the present invention.

Referring to FIG. 1, reference numeral 1 denotes a radio communication system according to the present invention, which is composed of plural radio communication terminals 2 that perform mutual communication via radio. In this radio communication system 1, frequency utilization efficiency can be improved by multiply using two types of multiple access systems, the UWB communication system and the CSMA system. That is, each radio communication terminal 2 spreads a communication wave by the UWB communication system and transmits this, however, it performs carrier sense prior to the transmission, and executes the transmission only when another radio communication terminals 2 are not on transmitting.

Next, the configuration of the radio communication terminal 2 will be described with reference to FIG. 2. In the radio communication terminal 2, a sending front end part 5 serving as sending means and a receiving front end part 6 serving as receiving means are respectively connected to a sending/receiving antenna 3 via an antenna sharing unit 4. A spreading part 7 is connected to the sending front end part 5 via an adder 8, and a back-spreading part 9 is connected to the receiving front end part 6.

The spreading part 7 serving as signal spreading means multiplies a predetermined PN code by a transmission signal S1 entered from a signal processing circuit in the previous stage to spread the band in a wide band, and generates a spread modulation signal S7, and supplies this to the sending front end part 5 via the adder 8. Here, the spread ratio is 1 or more and is variable. The spread ratio 1 means no spread. The sending front end part 5 performs analog conversion, modulation and amplification on the spread modulation signal S7, and transmits this as a communication wave via the sending/receiving antenna 3.

On the other hand, the receiving front end part 5 receives a communication wave from another radio communication terminal 2 via the sending/receiving antenna 3, amplifies and demodulates this, and performs digital conversion on this to generate a spread receiving signal S6, and supplies this to the back-spreading part 9. The back-spreading part 9 multiplies the same PN code as that it was used in the transmission by the spread receiving signal S6 to back-spread the band so as to remove the noise generates a receiving signal S9, and supplies this to a signal processing circuit in the following stage.

In this manner, the radio communication system 1 performs mutual communication between plural radio communication terminals 2 by the UWB communication system.

Figure 3:
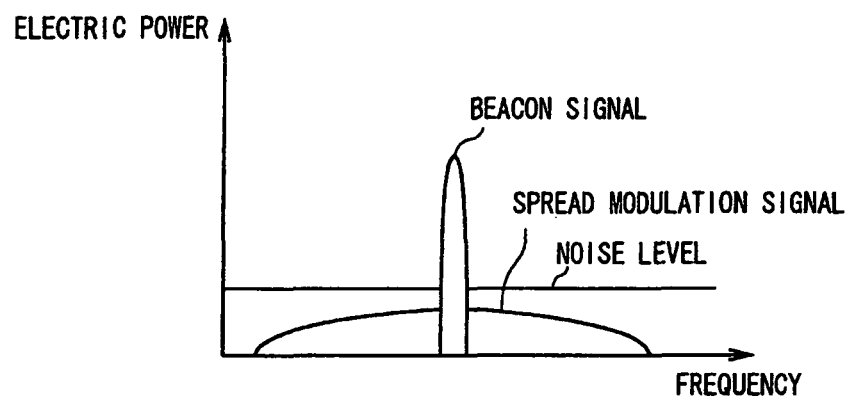
FIG. 3. is a schematic diagram showing the signal components of a spread modulation signal and a beacon signal.

In addition to the above configuration, in the radio communication terminal 2, a beacon signal generating part 10 for generating a beacon signal S10 having a predetermined narrowband sine wave is provided and, the adder 8 serving as signal synthesizing means synthesizes the beacon signal S10 with the spread modulation signal S7 supplied from the spreading part 7. Thereby, in the communication wave transmitted from the sending/receiving antenna 3, as shown in FIG. 3, the component of the spread modulation signal and the component of the beacon signal are included.

Here, since the spread modulation signal has been spread in a wide band, the electric power is a noise level or less and thus the presence of the signal can be detected only after back-spreading processing is performed. On the other hand, since the beacon signal has not been spread, it has a narrowband and the electric power is large and thus, the presence can be easily detected. The radio communication terminal 2 uses these points, and performs carrier sense on the component of the beacon signal in the communication wave.

Figure 2:
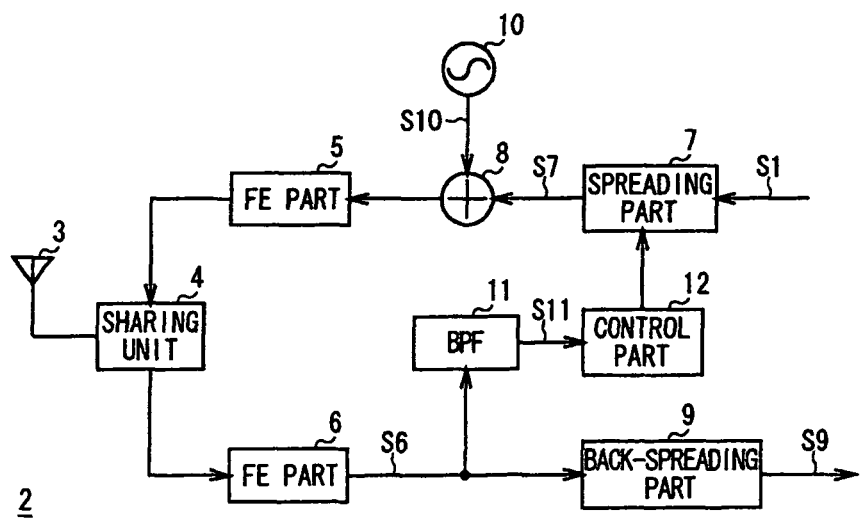
FIG. 2 is a block diagram showing the configuration of a radio communication terminal according to the present invention.

As shown in FIG. 2, a band-pass filter 11 is connected to the receiving front end part 6 of the radio communication terminal 2. The band-pass filter 11 serving as beacon signal separating means extracts a signal component in the band corresponding to the beacon signal S10 from the spread receiving signal S6, and supplies this to a control part 12 as a receiving beacon signal S11. The control part 12 performs carrier sense processing based on the receiving power level of the receiving beacon signal S11, and performs the transmission control of the communication wave.

Specifically, the control part 12 serving as detecting means compares the receiving power level of the receiving beacon signal S11 with a predetermined power level threshold value prior to the transmission of the communication wave. And if the receiving power level of the receiving beacon signal S11 is below the power level threshold value, the control part 12 serving as transmission control means judges that any other radio communication terminals 2 is not on transmitting, and permits the transmission of the communication wave.

On the contrary, if the receiving power level of the receiving beacon signal S11 is the power level threshold value or more, the control part 12 serving as transmission control means judges that any other radio communication terminal 2 is on transmitting (busy state), and forbids the transmission of the communication wave.

In this manner, the radio communication system 1 performs mutual communication by multiple access by using the UWB communication system together with the CSMA system, between plural radio communication terminals 2.

Note that, since the signal component of the receiving beacon signal S11 included in the spread receiving signal S6 is spread in a wide band when the back-spreading is performed in the back-spreading part 9, it does not have an effect on communication.

In the above configuration, at the time of transmitting, the radio communication terminal 2 synthesizes the beacon signal S10 with the spread modulation signal S7 obtained by spreading the transmission signal S1 by means of a PN code, and transmits this as a communication wave. On the other hand, at the time of receiving, the radio communication terminal 2 back-spreads the spread receiving signal S6 generated by receiving a communication wave by means of the PN code, and generates a receiving signal S9.

Furthermore, the radio communication terminal 2 extracts a signal component in the band corresponding to the beacon signal S10 from the spread receiving signal S6. Then, the radio communication terminal 2 executes carrier sense on the transmission, based on the receiving power level of the above extracted receiving beacon signal S11.

Here, the beacon signal S10 was not spread at the time of transmitting, so that the signal component of the beacon signal in the communication wave is a noise level or more. Therefore, the presence of the communication wave can be rapidly detected without back-spreading the spread receiving signal S6, and thus, multiple access using the UWB communication system together with the CSMA system can be realized.

Note that, in the aforementioned embodiment, it has dealt with the case where the present invention is applied to a radio communication system for performing mutual communication between plural radio communication terminals 2, however, the present invention is not only limited to this but also it may be applied to various radio communication systems such as a radio communication system for performing mutual communication between a master station and plural slave stations.

Furthermore, in the aforementioned embodiment, it has dealt with the case where the present invention is applied to a radio communication terminal for mutually performing sending/receiving, however, the present invention is not only limited to this but also it may be applied to a transmitting apparatus for simply synthesizing a beacon signal with a spread transmission signal and transmitting this, and a carrier sense apparatus for simply performing carrier sense, or the like.

(2) A Configuration of Radio Communication Terminal Using Impulse Signal on UWB System Next, the embodiment configuration of a radio communication terminal in the case where an impulse signal on the UWB system is used as a spread signal will be described in detail with reference to FIG. 4.

Figure 4:
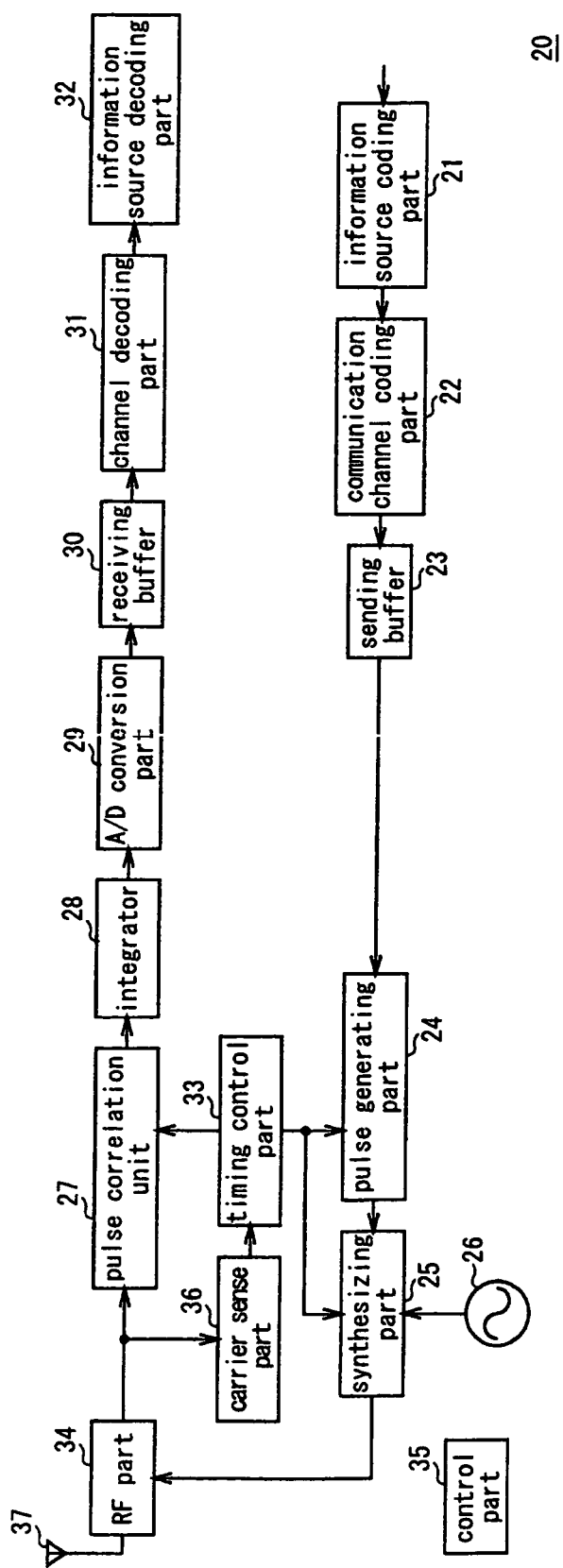
FIG. 4 is a block diagram showing the concrete configuration of a radio communication terminal.

As shown in FIG. 4, a radio communication terminal 20 is composed of elements for sending 21 to 26, elements for receiving 27 to 32, a sending/receiving timing control part 33, an RF part 34, a control part 35 for integratedly controlling the above radio communication terminal, and a carrier sense part 36.

At the time of transmitting, the source coding part 21 of the radio communication terminal 20 performs predetermined source coding processing on an information signal entered from the outside, and supplies this to a channel coding part 22. The channel coding part 22 performs predetermined channel coding processing on the information signal, and supplies this to a pulse generating part 24 via a sending buffer 23. The pulse generating part 24 serving as signal spreading means generates a spread modulation signal (UWB signal) that is obtained by modulating the information signal by an impulse signal and spreading by the UWB system, based on control by the timing control part 33, and supplies this to a synthesizing part 25.

On the other hand, a beacon signal generating part 26 supplies a beacon signal having no information and having a predetermined narrowband sine wave to the synthesizing part 25. The synthesizing part 25 serving as signal synthesizing means synthesizes the beacon signal with a UWB signal, and the synthesized signal is amplified by the RF part 34 serving as sending means, and then the amplified signal is transmitted as a communication wave via an antenna 37.

In this manner, the radio communication terminal 20 synthesizes the beacon signal not including information and having a narrow-band with the UWB signal, and transmits this. Then, at the time of receiving, the radio communication terminal 20 detects this beacon signal so as to predict the presence of the UWB signal transmitted from another radio communication terminal 20, and then starts the receiving operation of the above UWB signal.

Specifically, the RF part 34 serving as receiving means amplifies the receiving signal received via the antenna 37, and supplies this to a pulse correlation unit 27 and the carrier sense part 36. The carrier sense part 36 serving as beacon signal separating means and detecting means is always working. The carrier sense part 36 performs carrier sense by extracting the signal band of the beacon signal from the receiving signal supplied from the RF part 34 and comparing the receiving power level of the above beacon signal with a predetermined power level threshold value.

If the receiving power level of the beacon signal is the power level threshold value or more, or if a predetermined time passed after the beacon signal was detected, the carrier sense part 36 determines that another radio communication terminal 20 is transmitting a UWB signal, and supplies a carrier detection signal to the timing control part 33. The timing control part 33 serving as receiving control means starts the operation of the pulse correlation unit 27 according to the carrier detection signal, and starts the receiving of the UWB signal.

Figure 5:
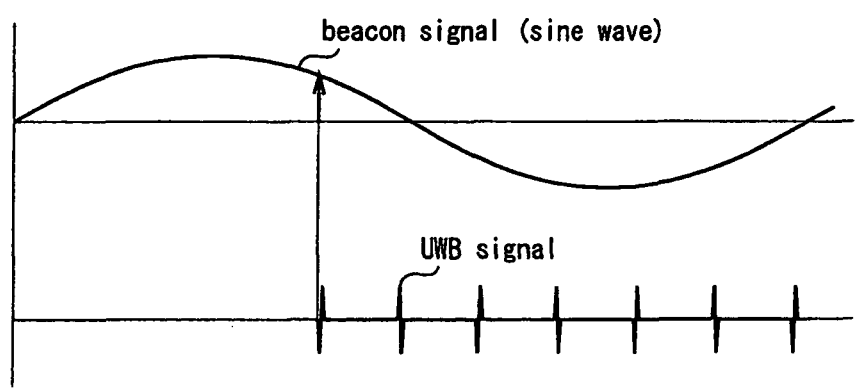
FIG. 5 is a schematic diagram for explaining a comparison of the waveforms of a UWB signal and a beacon signal.

FIG. 5 shows the waveforms of the sine wave of a beacon signal and the pulse wave of a UWB signal. The beacon signal is for example a sine wave at 2.4 GHz and the pulse width of the UWB signal is for example 1 nsec or less. If the receiving power level of the above beacon signal becomes a predetermined detection reference value after the beacon wave is detected, or if a predetermined time passed after the beacon signal was detected, the carrier sense part 36 sends a carrier detection signal and starts the receiving of the UWB signal. In order to establish further-fine receiving synchronization, it is preferable to use a preamble in the UWB signal.

First, the pulse correlation unit 27 obtains receiving synchronization with the above UWB signal based on a preamble (FIG. 5) that is a known pattern added to the head of the packet of the UWB signal. Then, the pulse correlation unit 27 serving as back-spreading means calculates the correlation of the UWB signal with the known impulse signal based on the obtained synchronous timing, integrates the correlation value by the number of pulses for one bit of transmission signal by an integrator 28, and outputs this.

An analog-to-digital conversion part 29 performs digital conversion on the correlation value integrated value outputted from the integrator 28, and supplies this to a channel decoding part 31 via a receiving buffer 30 as a demodulation signal. The channel decoding part 31 performs channel decoding processing on the demodulation signal, and supplies this to a source decoding part 32. The source decoding part further performs source decoding processing on the demodulation signal to restore the information signal, and outputs this to the outside.

In this manner, the radio communication terminal 20 performs mutual communication by multiple access by using the UWB system together with the CSMA system. Note that, the carrier detection signal outputted from the carrier sense part 36 may be directly inputted to the pulse correlation unit 27, and the operation of the pulse correlation unit 27 may be started based on the above carrier detection signal.

The timing control part 33 serving as transmission control means stops the transmission of the UWB signal by stopping the operation of the pulse generating part 24 and the synthesizing part 25 according to this carrier detection signal. Note that, the carrier detection signal outputted from the carrier sense part 36 may be directly inputted to the pulse generating part 24 and the synthesizing part 25, and the operation of the pulse generating part 24 and the synthesizing part 25 may be stopped based on the above carrier detection signal.

Figure 6:
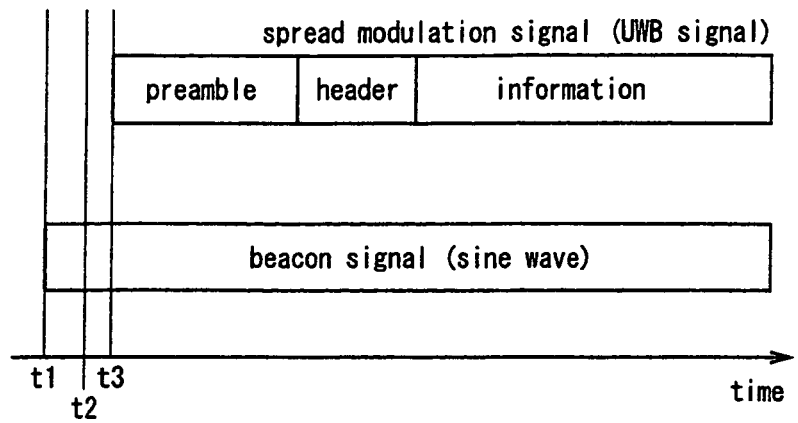
FIG. 6 is a schematic diagram for explaining receiving start timing.

Next, the aforementioned detection of the beacon signal and receiving start timing of the UWB signal will be described in detail with reference to FIG. 6. As shown in FIG. 6, the carrier sense part 36 starts to receive a beacon signal at a timing t1, and then it detects the above beacon signal at a timing t2. After the beacon signal is detected, it starts the operation of the simultaneous obtaining of the UWB signal from a timing t3, and performs simultaneous obtaining operation using the preamble of the UWB signal, in order to establish further-fine synchronization.

(3) Another Embodiment of Radio Communication Terminal

In the aforementioned embodiment, it has dealt with the case where a sine wave signal having no information is used as a beacon signal, however, the present invention is not only limited to this but also any radio communication signal for transmitting data may be used as a beacon signal if it can be easily detected.

Figure 7:
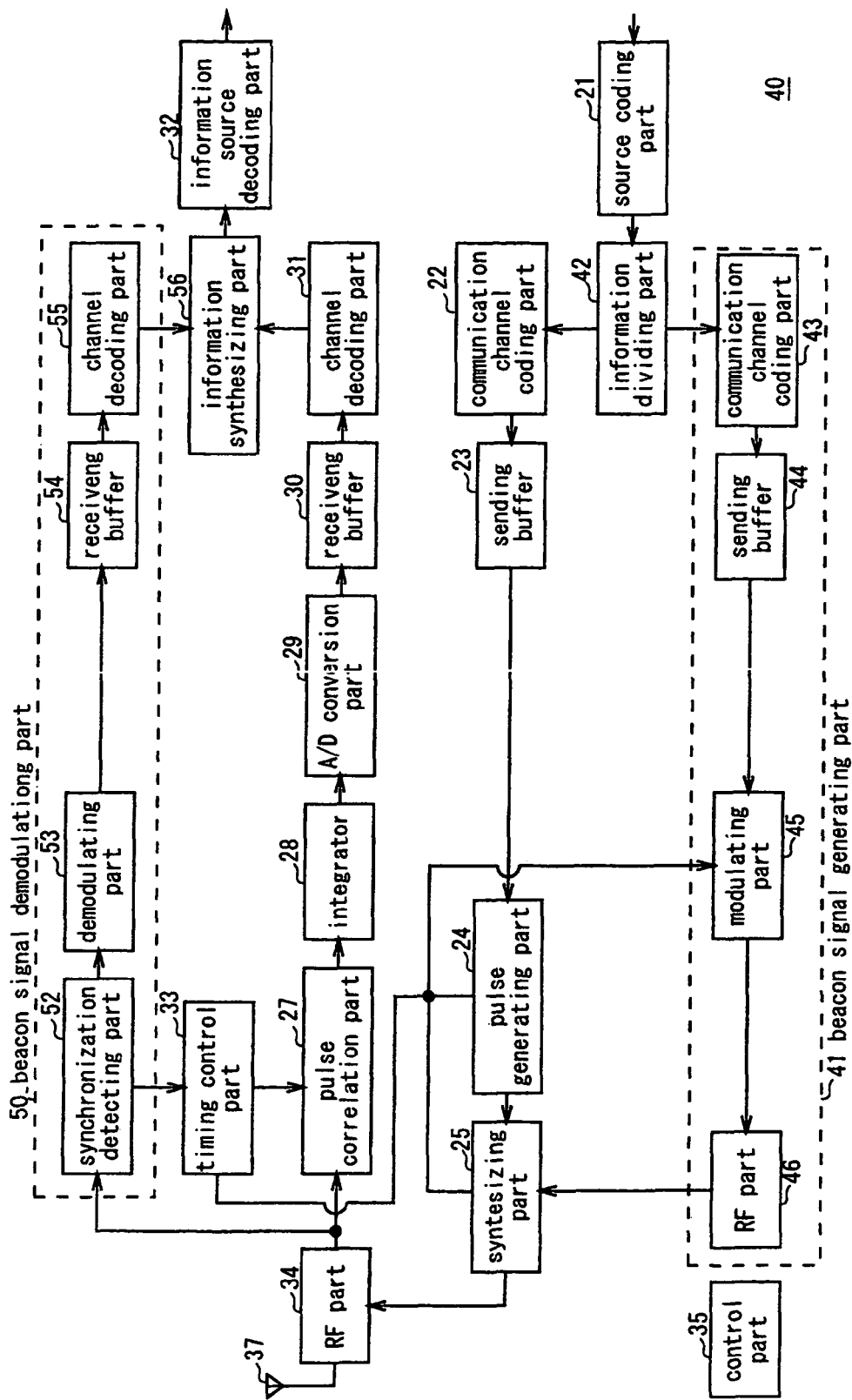
FIG. 7 is a block diagram showing the configuration of another embodiment of a radio communication terminal.
Figure 9:
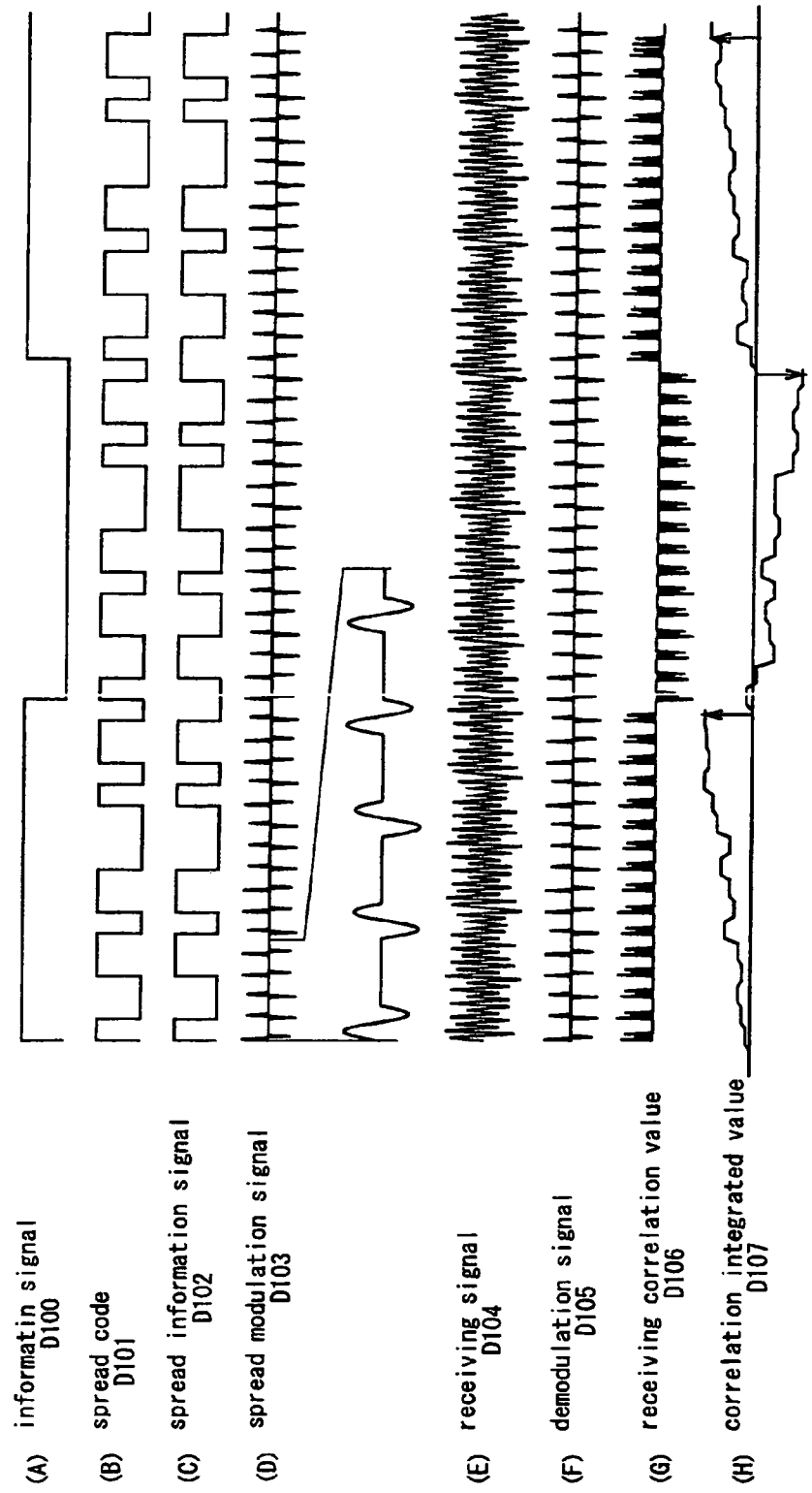
FIG. 9 is a schematic diagram showing sending/receiving signals by a UWB system.
Figure 10:
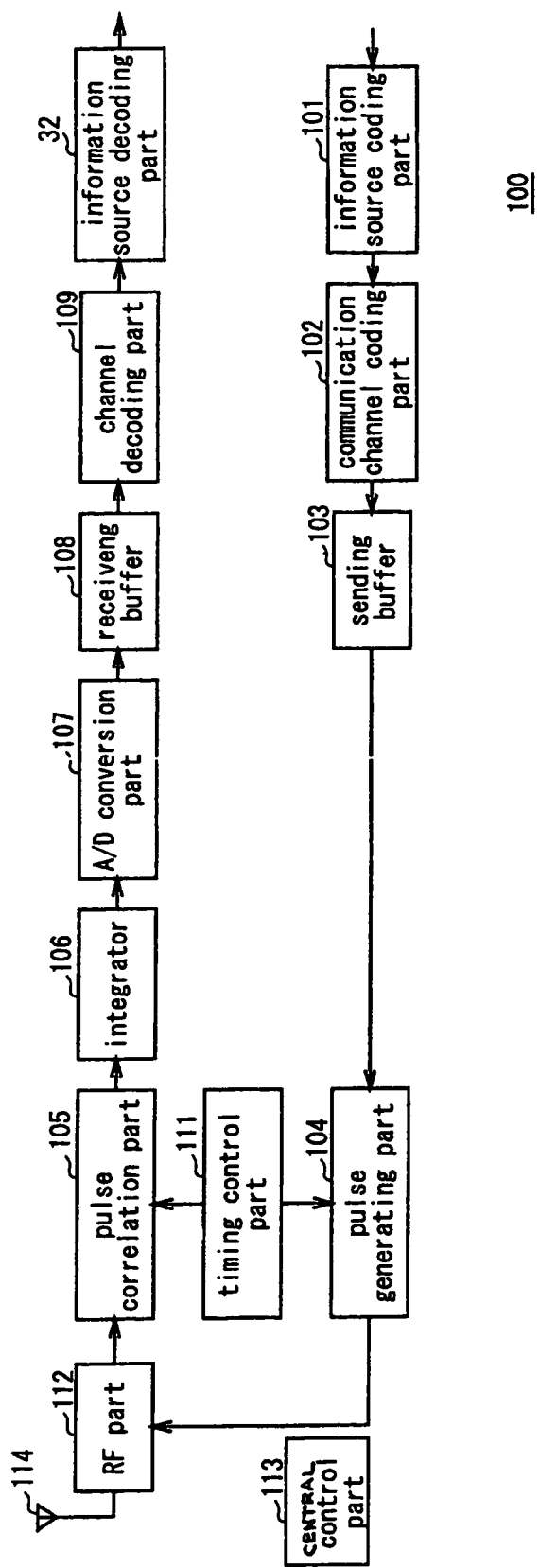
FIG. 10 is a block diagram showing the configuration of a radio communication terminal by the UWB system.

The configuration of a radio communication terminal in this case will be described with reference to FIG. 7. Referring to FIG. 7 in which the same reference numerals are added to corresponding parts in FIG. 4, in a radio communication terminal 40, a beacon signal generating part 41 serving as beacon signal generating means for generating a wireless LAN signal based on the IEEE-802.11 standard as a beacon signal is provided instead of the beacon signal generating part 26 shown in FIG. 4, and a beacon signal demodulating part 50 for demodulating the above beacon signal is provided.

In this radio communication terminal 40, an information signal subjected to source coding processing by the source coding part 21 is divided into two in an information dividing part 42 at a predetermined dividing rate, and supplies them to the channel coding part 22 and the beacon signal generating part 41 respectively.

The channel coding part 22 performs channel coding processing prescribed by the UWB system on the information signal, and supplies this to the pulse generating part 24 via the sending buffer 23. The pulse generating part 24 modulates the information signal by an impulse signal, generates a spread modulation signal (UWB signal) spread by the UWB system, and supplies this to the synthesizing part 25.

On the other hand, the communication channel coding part 43 of the beacon signal generating part 41 performs channel coding processing based on the IEEE-802.11 standard on the information signal, and supplies this to a modulating part 45 via a sending buffer 44. The modulating part 45 modulates the information signal by a modulation technique prescribed by the IEEE-802.11 standard, generates a wireless LAN signal, and supplies this to the synthesizing part 25 as a beacon signal after the frequency conversion by an RF part 46.

At this time, the pulse generating part 24 and the modulating part 45 of the beacon signal generating part 41 work according to timing control by the timing control part 33, so that the UWB signal and the wireless LAN signal are generated in synchronization with each other. The synthesizing part 25 synthesizes the wireless LAN signal with the UWB signal in synchronization with each other and it is amplified in the RF part 34, and then is transmitted via the antenna 37 as a communication wave.

At the time of receiving, the radio communication terminal 40 first performs carrier sense and synchronization obtaining on a wireless LAN signal. Then, the radio communication terminal 40 performs synchronization obtaining on a UWB signal based on the above obtained synchronous timing of the wireless LAN signal, so as to shorten the time necessary for the above synchronization obtaining of the UWB signal.

Specifically, the RF part 34 of the radio communication terminal 40 amplifies a receiving signal received via the antenna 37, and supplies this to the pulse correlation unit 27 and the synchronization detecting part 52 of the beacon signal demodulating part 50.

The synchronization detecting part 52 is always working, And it extracts the signal band of the wireless LAN signal from the receiving signal supplied from the RF part 34, compares the receiving power level of the above wireless LAN signal with a predetermined power level threshold value, and performs carrier sense. If the receiving power level of the wireless LAN signal is the power level threshold value or more, the synchronization detecting part 52 starts the synchronization detection of the above wireless LAN signal using the preamble part of the wireless LAN signal shown in FIG. 8.

If the synchronization detecting part 52 obtains the synchronization with the wireless LAN signal, the demodulation part 53 of the beacon signal demodulating part 50 demodulates the wireless LAN signal by the modulation technique based on the IEEE-802.11 standard based on the above obtained synchronous timing, generates a demodulation signal, and supplies this to a channel decoding part 55 via a receiving buffer 54. The channel decoding part 55 performs channel decoding processing on the demodulation signal, and supplies this to an information synthesizing part 56.

Furthermore, the synchronization detecting part 52 supplies a carrier detection signal to the timing control part 33 according to the synchronization obtaining of the wireless LAN signal. The timing control part 33 stops the operation of the pulse generating part 24, the synthesizing part 25 and the modulating part 45 according to the carrier detection signal, and stops the transmission of the communication wave.

The timing control part 33 generates a synchronous timing signal based on the synchronous timing of the wireless LAN signal obtained by the synchronization detecting part 52, and supplies this to the pulse correlation unit 27.

The pulse correlation unit 27 obtains receiving synchronization with a UWB signal based on the preamble (FIG. 7) added to the head of the packet of the UWB signal. At this time, the pulse correlation unit 27 performs synchronization obtaining based on the synchronous timing signal supplied from the timing control part 33, so that the time necessary for the above synchronization obtaining can be shortened. Then, the pulse correlation unit 27 calculates the correlation of the UWB signal with the known impulse signal based on the obtained receiving synchronization, integrates the correlation value by the integrator 28 by the number of pulses for one bit of a transmission signal, and outputs this.

The analog-to-digital conversion part 29 performs digital conversion on the correlation value integrated value outputted from the integrator 28, and supplies this to the channel decoding part 31 as a demodulation signal via the receiving buffer 30. The channel decoding part 31 performs channel decoding processing on the demodulation signal, and supplies the decoded signal to the information synthesizing part 56.

The information synthesizing part 56 synthesizes the demodulation signal supplied from the channel decoding part 31 with the demodulation signal supplied from the channel decoding part 55 of the beacon signal demodulating part 50, and supplies the synthesized signal to the source decoding part 32. The source decoding part 32 performs source decoding processing on the demodulation signal, restores the information signal and outputs this to the outside.

In this manner, the radio communication terminal 40 performs data transmission by the multiple access by using the UWB system together with the CSMA system, via the spread modulation signal on the UWB system and the wireless LAN signal serving as a beacon signal.

Figure 8:
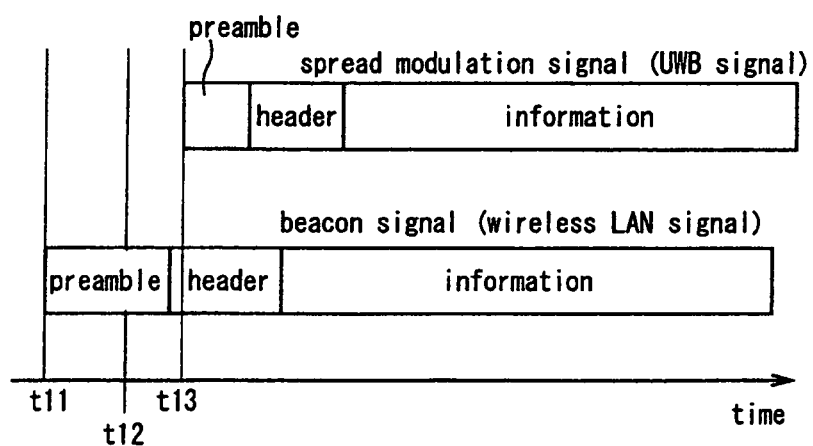
FIG. 8 is a schematic diagram for explaining a receiving start timing in the other embodiment.

Next, the aforementioned detection of the wireless LAN signal and the start timing of the receiving of the UWB signal will be described in detail with reference to FIG. 8. As shown in FIG. 8, the carrier sense part 36 starts to receive the wireless LAN signal at a timing t11, and then it obtains the synchronization with the above wireless LAN signal at a timing t12 by means of a preamble. After the synchronization with the wireless LAN signal is obtained, the carrier sense part 36 starts the operation of the synchronization obtaining of the UWB signal from a timing t13, and performs synchronization obtaining operation using the preamble of the UWB signal, in order to establish further-fine synchronization.

Here, the wireless LAN signal based on the IEEE-802.11 standard has a narrowband, and the receiving power is large, so that it is easy for signal detection and synchronization obtaining as compared with the UWB signal case. In this radio communication terminal 40 as described above, at the time of transmitting, the UWB signal is synthesized with the wireless LAN signal, they are synchronized with each other, and the synthesized signal is transmitted, and at the time of receiving, first, carrier sense and synchronization obtaining are performed on the wireless LAN signal, and synchronization with the UWB signal is obtained by means of the synchronous timing of the above wireless LAN signal. Thereby, the time necessary for the synchronization obtaining of the above UWB signal can be shortened. Thus, the data length of a preamble in the packet of the UWB signal can be shortened, and the data transmission efficiency in the radio communication terminal 40 can be generally improved.

Note that, in the aforementioned embodiment, it has dealt with the case where an information signal is divided into two, and they are sent via the UWB signal and the wireless LAN signal, however, the present invention is not only limited to this but also different information signals may be transmitted via the UWB signal and the wireless LAN signal. In this case, the information dividing part 42 (FIG. 6) becomes unnecessary, and a unit for UWB signal and a unit for wireless LAN signal must be separately provided in the source coding part 21. Furthermore, also the receiving side must have a configuration corresponding to this.

In the aforementioned embodiment, it has dealt with the case where one UWB signal and one wireless LAN signal are generated. However, the present invention is not only limited to this but also plural UWB signals and plural wireless LAN signals may be generated.

According to the present invention as described above, by transmitting the spread demodulation signal in a predetermined band, by spreading the coded signal from a received radio wave and by detecting the presence of the radio wave, the carrier sense of a radio wave subjected to spread spectrum can be performed with a simple configuration.

Furthermore, according to the present invention, the start timing of a spread modulation signal can be decided according to the detection of a beacon signal. Further, in the case where data is transmitted with the spread modulation signal via the beacon signal, synchronization with the spread modulation signal is obtained by means of the synchronous timing of the beacon signal, so that the time necessary for obtaining the above synchronization with the spread modulation signal can be shortened and the data length of a preamble for synchronization in the spread modulation signal can be shortened and thus, data transmission efficiency can be generally improved.

INDUSTRIAL APPLICABILITY

The transmitting apparatus, the transmitting method, the transmission control program and the transmission control program storage medium, the receiving apparatus, the receiving method, the receiving control program and the receiving control program storage medium of the present invention can be suitable applied to the wireless LAN system.

The invention claimed is:

1. A transmitting-receiving apparatus, comprising:
signal spreading means for multiplying an outgoing information signal by a spread code to spread a band and generate an outgoing spread information signal;
beacon signal generating means for generating, in synchrony with the outgoing spread information signal, a wireless local area network (LAN) signal as an outgoing beacon signal for the outgoing spread information signal;
first synchronization detecting means for detecting synchronization timing of a received wireless LAN signal that serves as a received beacon signal;
second synchronization detecting means for detecting, in response to the first synchronization detecting means detecting the synchronization timing of the received wireless LAN signal, synchronization timing of a received spread information signal that is coordinated with the received wireless LAN signal; and
timing control means for controlling processing of the received spread information signal using the detected synchronization timing of the received spread information signal.

2. The apparatus according to claim 1, wherein a transmission signal on a radio communication system different from the spread information signal is used as the beacon signal.

3. The transmitting-receiving apparatus according to claim 1, wherein the first synchronization detecting means detects synchronization timing of the received wireless LAN signal based on a preamble of the received wireless LAN signal, and the second synchronization detecting means detects synchronization timing of the received spread information signal based on a preamble of the received spread information signal.

4. The transmitting-receiving apparatus according to claim 3, wherein the preamble of the received wireless LAN signal precedes the preamble of the received spread information signal.

5. A transmitting-receiving method, comprising:
a signal spreading step of multiplying an outgoing information signal by a spread code to spread a band and generate an outgoing spread information signal;
a beacon signal generating step of generating, in synchrony with the outgoing spread information signal, a wireless local area network (LAN) signal as an outgoing beacon signal;
a first synchronization detecting step of detecting synchronization timing of a received wireless LAN signal that serves as a received beacon signal;
a second synchronization detecting step of detecting, in response to the first synchronization detecting step detecting the synchronization timing of the received wireless LAN signal, synchronization timing of a received spread information signal that is coordinated with the received wireless LAN signal; and
a timing transmission control step of controlling processing of a received spread information signal using the detected synchronization timing of the received spread information signal.

6. The method according to claim 5, wherein a transmission signal on a radio communication system different from the spread information signal is used as the beacon signal.

7. The transmitting-receiving method according to claim 5, wherein the first synchronization detecting means detects synchronization timing of the received wireless LAN signal based on a preamble of the received wireless LAN signal, and the second synchronization detecting means detects synchronization timing of the received spread information signal based on a preamble of the received spread information signal.

8. The transmitting-receiving method according to claim 7, wherein the preamble of the received wireless LAN signal precedes the preamble of the received spread information signal.

9. A receiving apparatus, comprising:
receiving means for receiving a radio wave that was obtained by synthesizing a spread information signal, in which an information signal is multiplied by a spread code and a band is spread, together with a wireless local area network (LAN) signal that serves a beacon signal and that is in synchrony with the spread information signal;
beacon signal separating means for separating the beacon signal by extracting only the wireless LAN signal from the received radio wave;
first synchronization detecting means for detecting synchronization timing of the separated wireless LAN signal;
second synchronization detecting means for detecting, in response to the first synchronization detecting means detecting the synchronization timing of the received wireless LAN signal, synchronization timing of the spread information signal; and
timing control means for controlling processing of the spread information signal using the detected synchronization timing of the spread information signal.

10. The receiving apparatus according to claim 9, wherein the beacon signal is a transmission signal on a radio communication system different from the spread information signal.

11. The apparatus according to claim 9, wherein the synthesizing of the spread information signal with the beacon signal involves adding the spread information signal with the beacon signal, and wherein the beacon signal is not spread in the band when the spread information signal is added with the beacon signal.

12. The receiving apparatus according to claim 9, wherein the first synchronization detecting means detects synchronization timing of the received wireless LAN signal based on a preamble of the received wireless LAN signal, and the second synchronization detecting means detects synchronization timing of the received spread information signal based on a preamble of the received spread information signal.

13. The receiving apparatus according to claim 12, wherein the preamble of the received wireless LAN signal precedes the preamble of the received spread information signal.

14. A receiving method, comprising:
a receiving step of receiving a radio wave that was obtained by synthesizing a spread information signal, in which an information signal is multiplied by a spread code and a band is spread, together with a wireless local area network (LAN) signal that serves a beacon signal and that is in synchrony with the spread information signal;
a beacon signal separating step of separating the beacon signal by extracting only the wireless LAN signal from the received radio wave;
a first synchronization detecting step of detecting synchronization timing of the separated wireless LAN signal;
a second synchronization detecting step of detecting, in response to the first synchronization detecting step detecting the synchronization timing of the received wireless LAN signal, synchronization timing of the spread information signal; and a timing control step of controlling processing of the spread information signal using the detected synchronization timing of the spread information signal.

15. The receiving method according to claim 14, wherein the beacon signal is a transmission signal on a radio communication system different from the spread information signal.

16. The method according to claim 14, wherein the synthesizing of the spread information signal with the beacon signal involves adding the spread information signal with the beacon signal, and wherein the beacon signal is not spread in the band when the spread information signal is added with the beacon signal.

17. The receiving method according to claim 14, wherein the first synchronization detecting means detects synchronization timing of the received wireless LAN signal based on a preamble of the received wireless LAN signal, and the second synchronization detecting means detects synchronization timing of the received spread information signal based on a preamble of the received spread information signal.

18. The receiving method according to claim 17, wherein the preamble of the received wireless LAN signal precedes the preamble of the received spread information signal.

* * * * *